US010602226B2

United States Patent
Polatkan et al.

(10) Patent No.: US 10,602,226 B2
(45) Date of Patent: Mar. 24, 2020

(54) RANKING CAROUSELS OF ON-LINE RECOMMENDATIONS OF VIDEOS

(71) Applicant: Microsoft Technology Licensing, LLC, Redmond, WA (US)

(72) Inventors: Gungor Polatkan, San Jose, CA (US); Yulia Astakhova, Oakland, CA (US); Deepak Kumar, Mountain View, CA (US); Konstantin Salomatin, San Francisco, CA (US); Jeffrey Douglas Gee, San Francisco, CA (US); Mahesh S. Joshi, Belmont, CA (US); Shivani Rao, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 16/020,843

(22) Filed: Jun. 27, 2018

(65) Prior Publication Data

US 2020/0007937 A1   Jan. 2, 2020

(51) Int. Cl.
  *H04N 21/47* (2011.01)
  *H04N 21/466* (2011.01)
  (Continued)

(52) U.S. Cl.
  CPC ....... *H04N 21/4756* (2013.01); *H04N 21/237* (2013.01); *H04N 21/2407* (2013.01);
  (Continued)

(58) Field of Classification Search
  CPC ........... H04N 21/4756; H04N 21/4668; H04N 21/478; H04N 21/4667; H04N 21/237; H04N 21/2407; H04N 21/252; H04N 21/25883; H04N 21/2743; G06Q 50/01
  See application file for complete search history.

(56) References Cited

U.S. PATENT DOCUMENTS 9,092,489 B1 *   7/2015   Dasilva ............ H04N 21/25883
9,235,625 B2 *   1/2016   Lewis ................... G06F 16/951
(Continued)

*Primary Examiner* — Mulugeta Mengesha
*Assistant Examiner* — Alazar Tilahun
(74) *Attorney, Agent, or Firm* — Schwegman Lundberg & Woessner, P.A.

(57) ABSTRACT

The recommendation system provided with an on-line connection system identifies on-line recommendations of videos and generates a user interface (UI) by including into the resulting presentation selected recommendations of videos. The recommendations of videos presented in the UI are organized into groups that are topically coherent, where each group is decorated with a context annotation—an explanation of why the recommendations in a given carousel are relevant for a member. Each video that is being evaluated by the recommendation system with respect to a subject member profile is assigned an annotation that is selected from a plurality of potentially applicable annotations. The technical problem of optimizing an order of presentation of recommendations grouped by context annotations, in a UI where annotations drive the layout, is addressed by deriving ranks for different context annotations based on global and personalized click through rates and using these values assigned to respective context annotations in constructing the UI.

20 Claims, 4 Drawing Sheets

(51) Int. Cl.

| | |
|---|---|
| *H04N 21/478* | (2011.01) |
| *H04N 21/45* | (2011.01) |
| *H04N 21/475* | (2011.01) |
| *H04N 21/237* | (2011.01) |
| *H04N 21/24* | (2011.01) |
| *H04N 21/2743* | (2011.01) |
| *H04N 21/25* | (2011.01) |
| *H04N 21/258* | (2011.01) |
| *G06Q 50/00* | (2012.01) |

(52) U.S. Cl.
CPC ..... *H04N 21/252* (2013.01); *H04N 21/25883* (2013.01); *H04N 21/2743* (2013.01); *H04N 21/4667* (2013.01); *H04N 21/4668* (2013.01); *H04N 21/478* (2013.01); *G06Q 50/01* (2013.01)

(56) References Cited

U.S. PATENT DOCUMENTS

| | | | | |
|---|---|---|---|---|
| 9,811,514 | B1* | 11/2017 | Lewis | G06Q 50/01 |
| 10,051,303 | B2* | 8/2018 | Gordon | H04N 21/4532 |
| 2008/0301241 | A1* | 12/2008 | Svendsen | G06Q 30/0631 |
| | | | | 709/206 |
| 2009/0265338 | A1* | 10/2009 | Kraft | G06F 16/951 |
| 2013/0013458 | A1* | 1/2013 | Uribe | G06Q 30/0201 |
| | | | | 705/26.64 |
| 2014/0067828 | A1* | 3/2014 | Archibong | G06F 3/0481 |
| | | | | 707/748 |
| 2014/0281978 | A1* | 9/2014 | Ye | G06F 3/01 |
| | | | | 715/716 |
| 2015/0161128 | A1* | 6/2015 | Goel | G06F 16/9577 |
| | | | | 707/726 |
| 2016/0125085 | A1* | 5/2016 | Vasudevan | G06F 16/9535 |
| | | | | 707/734 |

* cited by examiner

RANKING CAROUSELS OF ON-LINE RECOMMENDATIONS OF VIDEOS

TECHNICAL FIELD

This application relates to the technical fields of software and/or hardware technology and, in one example embodiment, to system and method to rank carousels of on-line recommendations of videos in an on-line connection system.

BACKGROUND

An on-line connection network is a platform for connecting people in virtual space. An on-line connection network may be a web-based platform, such as, e.g., a connection networking web site, and may be accessed by a user via a web browser or via a mobile application provided on a mobile phone, a tablet, etc. An on-line connection network may be a business-focused connection network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a connection networking web site may emphasize employment history and professional skills of the associated member.

An on-line connection system may provide members with on-line access to various videos, such as, e.g., educational video courses. A member can access a video by selecting an item on a designated web page provided by the on-line connection system. A member may also be presented with recommendations of videos that may be provided as one or more carousels.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
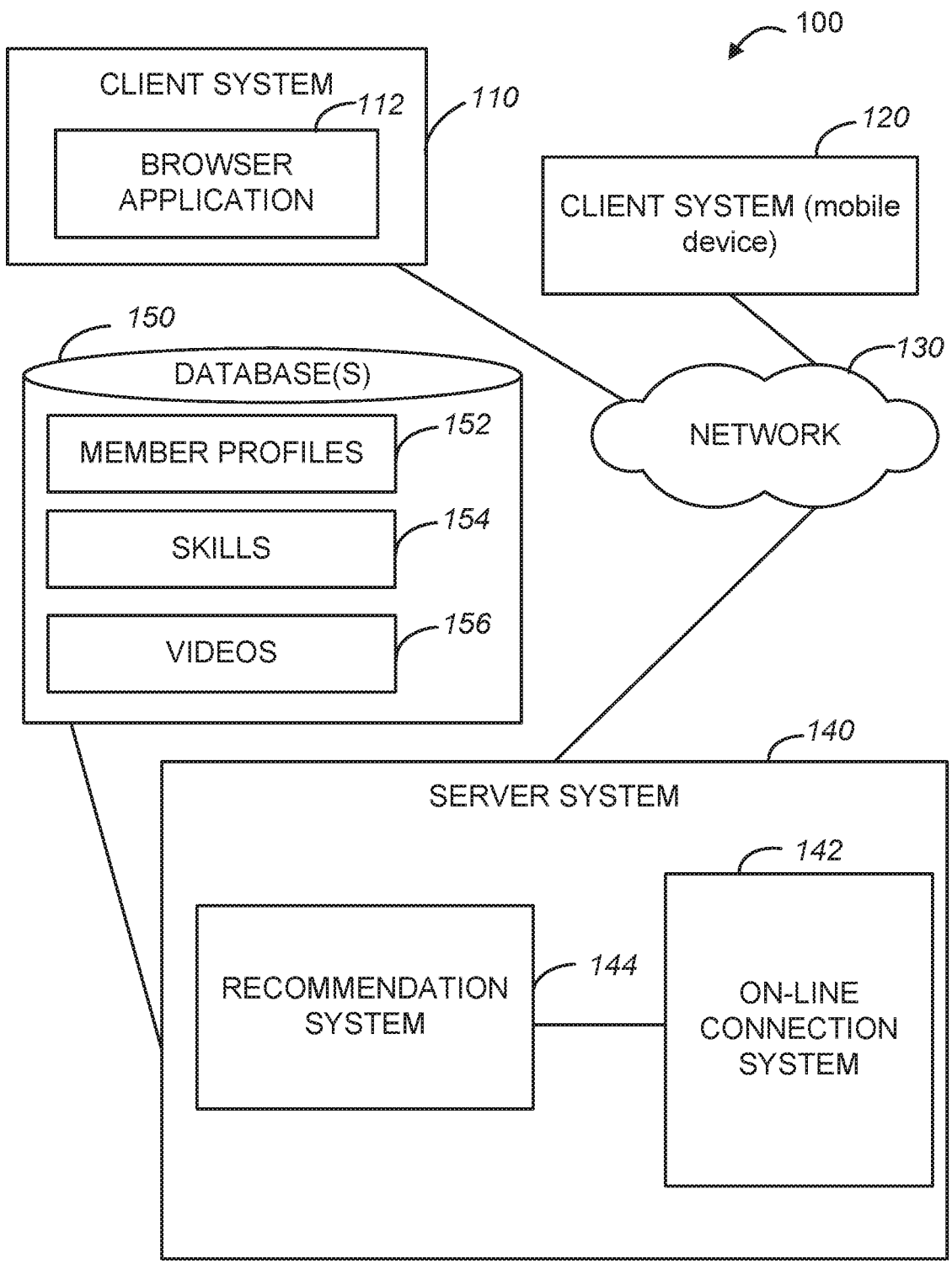
FIG. 1 is a diagrammatic representation of a network environment within which an example method and system to rank carousels of on-line recommendations of videos may be implemented.

A method and system to rank carousels of on-line recommendations of videos in an on-line connection system are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an on-line connection networking application" and "an on-line connection system" may be referred to as and used interchangeably with the phrase "an on-line connection network" or merely "a connection network." It will also be noted that an on-line connection network may be any type of an on-line connection network, such as, e.g., a professional network, an interest-based network, or any on-line networking system that permits users to join as registered members. Each member of an on-line connection network is represented by a member profile (also referred to as a profile of a member or simply a profile). A member profile may be associated with connection links that indicate the member's connection to other members of the connection network. A member profile may also include or be associated with comments or recommendations from other members of the on-line connection network, with links to other network resources, such as, e.g., publications, etc. As mentioned above, an on-line connection networking system may be designed to allow registered members to establish and document networks of people they know and trust professionally. Any two members of a connection network may indicate their mutual willingness to be "connected" in the context of the connection network, in that they can view each other's profiles, profile recommendations and endorsements for each other and otherwise be in touch via the connection network. Members that are connected in this way to a particular member may be referred to as that particular member's connections or as that particular member's network. The profile information of a connection network member may include various information such as, e.g., the name of a member, current and previous geographic location of a member, current and previous employment information of a member, information related to education of a member, information about professional accomplishments of a member, publications, patents, etc. As mentioned above, the profile information of a connection network member may also include information about the member's professional skills.

As mentioned above, the on-line connection system provides members with access to various on-line educational videos and includes a recommendation system that generates recommendations of videos to members. With respect to a given member profile, the recommendation system identifies videos that are potentially of interest to the associated member, using methodologies such as, e.g., collaborative filtering, logistic regression, etc. For example, recommendations of videos can be generated based on historical information indicating which videos the member has already watched and similarity of other videos to those videos already watched. Another approach to deriving recommendations of videos is based on the determined overlap (or lack) of skills that are listed in a member profile. Yet another approach is based on popularity of a video among member profiles that are similar to the subject member profile, etc. A skill, for the purposes of this description is an item of information that represents a skill of a member in an on-line connection system and that is stored in a skills database maintained by the on-line connection system. Each skill-related entry in the skills database includes a phrase (e.g., "programming" or "patent prosecution") that can appear in a member profile maintained by the on-line connection system in one or more designated profile sections, such as, e.g., in the skills and endorsements section of a profile.

The recommendations system provided with the on-line connection system generates a user interface (UI) by including into the resulting presentation selected recommendations of videos. In some embodiments, the recommendations of videos (also referred to as recommended videos) presented in the UI are organized into groups that are topically coherent, where each group is decorated with an explanation of why the recommendations in a given carousel are relevant for a member (for example, "Videos trending in your title" or "Because you watched a video on music theory"). An explanation that decorates a recommendation of a group of recommendations of videos is termed a context annotation, a context type or merely an annotation.

Each video that is being evaluated by the recommendation system with respect to a subject member profile is assigned an annotation that is selected from a plurality of potentially applicable annotations. In operation, for each pair comprising the subject member profile and a video from a set of potentially relevant videos, the recommendation system generates a score for each annotation from a plurality of potentially applicable annotations. The scores of different annotations can then be normalized/transformed into the same numerical range for comparability. The annotation with the highest score is assigned to the pair comprising the subject member profile and the video. The recommendation system scores each given annotation by means of a machine learning model that uses information specific to this annotation. For example, with respect to "trending in your industry" annotation, the recommendation system scores all the videos according to their popularity within this industry (e.g., by weighted number of video completions), and uses these scores as the annotation scores for members in the industry. With respect to "because you watched" annotation, the recommendation system uses collaborative filtering, where the annotation score for a video is calculated based on the similarity of the video to videos previously watched by the member represented by the subject profile. As such, at the time the videos are being ranked for relevance with respect to the subject member profile, each video has been assigned an annotation with respect to that subject member profile.

The groups of recommendations of videos may be displayed in the UI as respective carousels. A carousel, for the purposes of this description, is a UI component comprising a plurality of frames that can be scrolled through in horizontal order, back and forth. A frame representing a recommended video in a carousel can be actionable to initiate a preview of the associated video or the playing of the recommended video.

While recommendations of videos are selected for inclusion into the UI based on their respective relevance scores indicating high probability that the subject member will engage with the recommendation, the ordering of these carousels in the UI may affect the resulting level of the user's engagement with the presented frames. For example the carousel with the context annotation "Trending for your Title" presented more prominently (e.g., at the top of the screen) as compared to the carousel with the context annotation "Stay Sharp on Skill" may result in greater engagement metrics than if these carousels are presented in a different order.

The technical problem of optimizing an order of presentation of recommendations grouped by context type (by context annotations), in a UI where annotations drive the layout, is addressed by the methodologies described herein that derive ranks for different context types based on global and personalized click through rates and use these values assigned to respective context types in constructing the UI. Specifically, the recommendation system ranks context annotation according to the following criteria: (1) how popular the annotation is in general and (2) personalized preference of the subject member with respect to the annotation. The global popularity score for an annotation is calculated based on the click through rate (CTR) for groups associated with the annotation across a population of member profiles (e.g., all member profiles in the on-line social network system or a subset selected based on a characteristic such as industry), also termed global CTR. The personalized popularity score for an annotation is calculated based on the click through rate (CTR) for the subject member profile with respect to that specific annotation, also termed personal CTR. In one embodiment, the formula for combining the global popularity score and the personal popularity score for an annotation (in order to derive a combined popularity score that is used for ranking the annotations) can be a convex combination of the two: (w1×personal CTR+w2× global CTR), where w1 and w2 are weights assigned to the global popularity score and the personalized popularity score. Effectively, the recommendation system performs smoothing of the per-user CTR computation, where the smoothing is performed by the global CTR. Alternatively, a different variant of smoothing can be used, where respective combined popularity scores for annotations are calculated as follows: (personal Engagements+w×global CTR)/(personal Impressions+w), where personal Engagements is a count of clicks on the annotation for which the rank is being calculated, personal Impressions is a count of impressions of that annotation, both with respect to the subject member profile.

The process of ranking context annotations associated with groups of recommended videos is executed subsequent to associating each video potentially relevant to a subject member profile with an annotation and subsequent to selecting the recommended videos for the subject member profile. An example recommendation system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line connection system 142. As explained above, each member of an on-line connection network is represented by a member profile that contains personal and professional information about the member and that may be associated with connection links that indicate the member's connection to other member profiles in the on-line connection network. Member profiles and related information may be stored in a database 150 as member profiles 152. The database 150 also stores skills 154.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a recommendation system 144. The recommendation system 144 is configured to rank carousels of on-line recommendations of videos, applying methodologies discussed herein. Electronic videos may be provided by the on-line connection network and stored as videos 156 in the database 150. An example recommendation system 144 is illustrated in FIG. 2.

Figure 2:
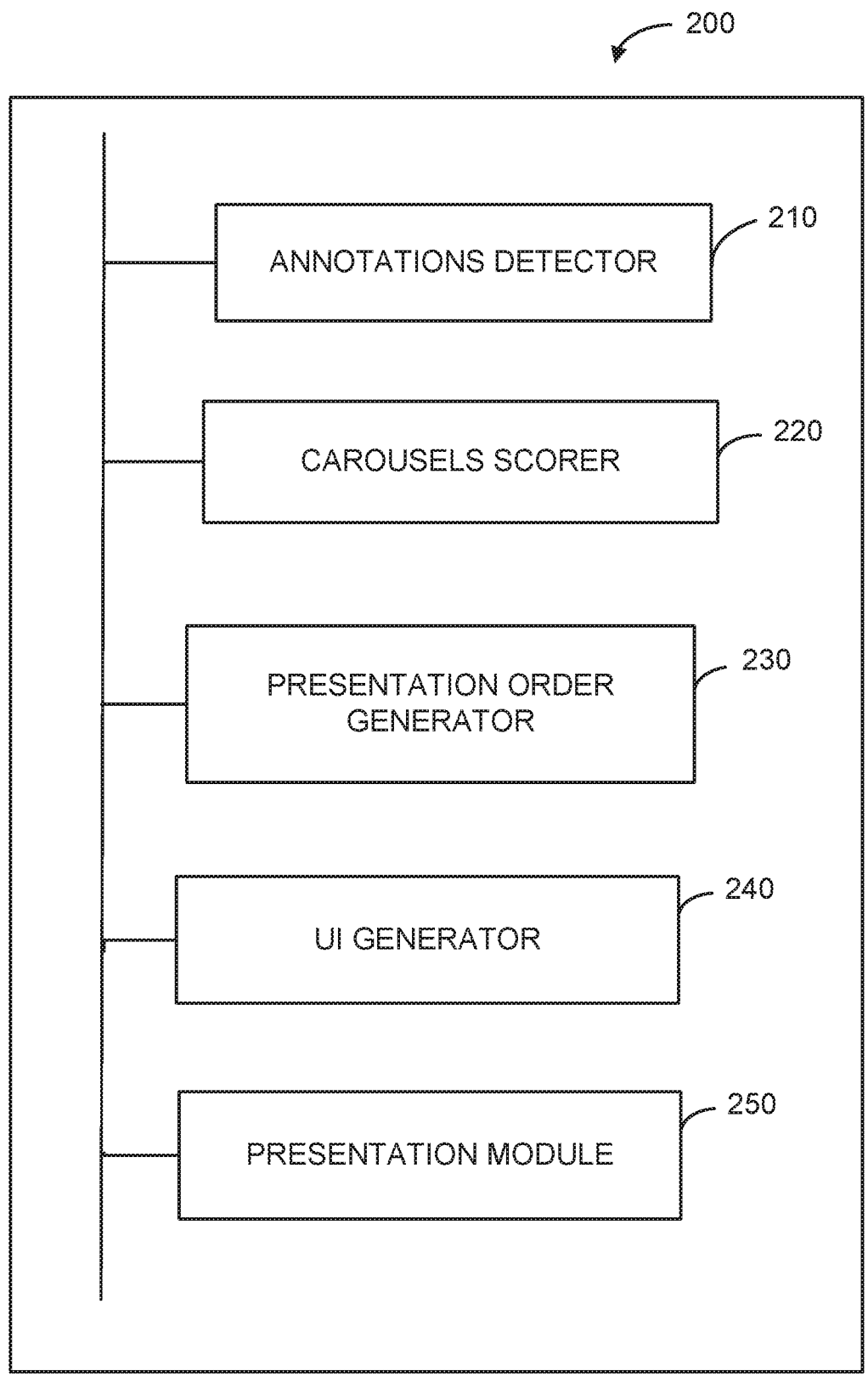
FIG. 2 is block diagram of a system to rank carousels of on-line recommendations of videos, in accordance with one example embodiment.

FIG. 2 is a block diagram of a system 200 to rank carousels of on-line recommendations of videos. As shown in FIG. 2, the system 200 includes an annotations detector 210, a carousels scorer 220, a presentation order generator 230, a UI generator 240, and a presentation module 250. The annotations detector 210 is configured to determine a set of context annotations associated with recommended videos selected for a subject member profile representing a member in an on-line connection system. The carousels scorer 220 calculates a combined popularity score for each annotation from the set of context annotations determined by the annotations detector 210. As explained above, the combined popularity score is calculated as a combination of a global popularity score and a personalized popularity score. The global popularity score is derived using a CTR for groups of recommendations associated with the respective annotations for a set of member profiles representing members in the on-line connection system. The personalized popularity score is derived using a CTR for groups of recommendations associated with the respective annotations for the subject member profile.

The presentation order generator 230 is configured to determine an order of presentation of carousels. Each carousel has frames representing a subset of the recommended videos identified as associated with a particular annotation from the set of context annotations. The presentation order generator 230 determines the order of presentation of these carousels prepared for the subject member profile based on respective combined popularity scores generated for annotations associated with the respective carousels. The UI generator 240 generates a presentation UI by including the carousels into the UI in the determined order. The presentation module 250 is configured to cause presentation of the generated presentation UI on a display device.

As mentioned above, an annotation from the set of context annotation may indicate that an associated video recommendation is similar to one or more videos previously watched by the member or that an annotation from the set of context annotation indicates that an associated video recommendation is popular among member represented by member profiles that are similar to the subject member profile. Some operations performed by the system 200 may be described with reference to FIG. 3.

Figure 3:
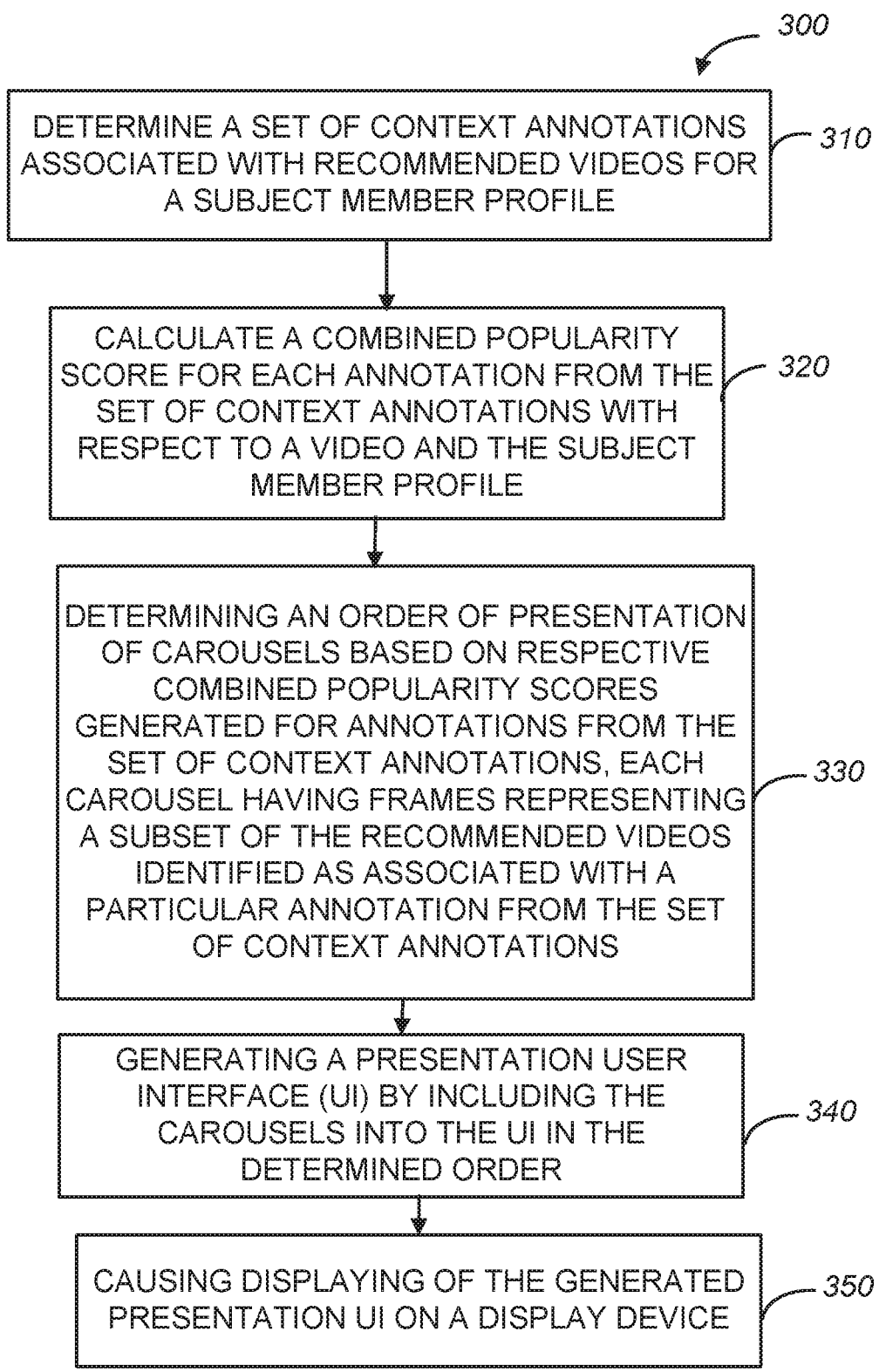
FIG. 3 is a flowchart illustrating a method to rank carousels of on-line recommendations of videos, in accordance with an example embodiment.

FIG. 3 is a flowchart of a method 300 to rank carousels of on-line recommendations of videos 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the annotations detector 210 of FIG. 2 determines a set of context annotations associated with recommended videos selected for a subject member profile representing a member in an on-line connection system. At operation 320, the carousels scorer 220 of FIG. 2 calculates a combined popularity score for each annotation from the set of context annotations determined by the annotations detector 210. The presentation order generator 230 of FIG. 2 determines an order of presentation of carousels at operation 330, where each carousel has frames representing a subset of the recommended videos identified as associated with a particular annotation from the set of context annotations. At operation 340, the UI generator 240 of FIG. 2 generates a presentation UI by including the carousels into the UI in the determined order. The presentation module 250 of FIG. 2 causes presentation of the generated presentation UI on a display device, at operation 350.

Figure 4:
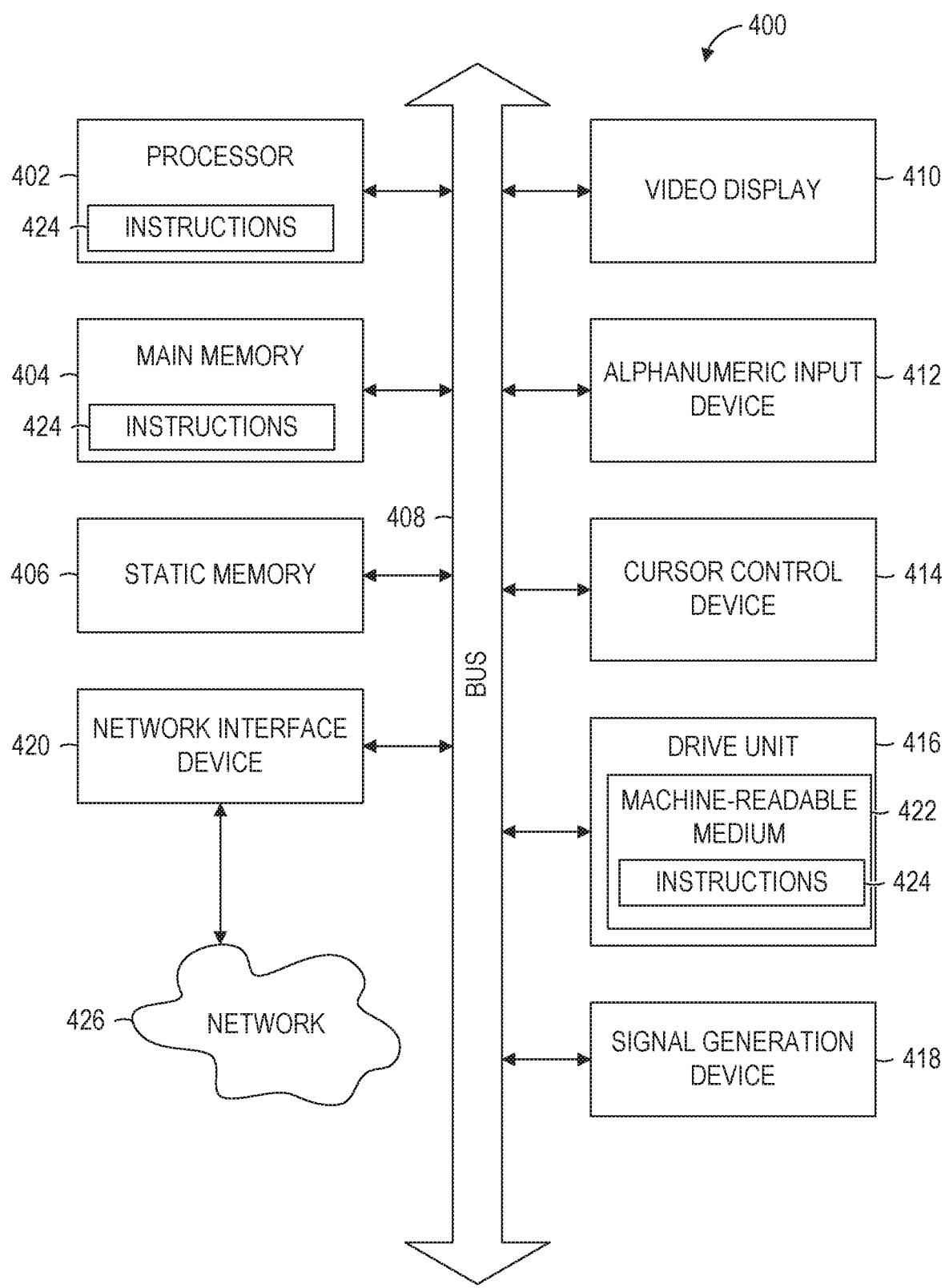
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to rank carousels of on-line recommendations of videos has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
   determining a set of context annotations associated with recommended videos selected for a subject member profile representing a member in an on-line connection system;
   for each annotation from the set of context annotations, calculating a combined popularity score as a combination of a global popularity score and a personalized popularity score, the global popularity score derived using a click through rate (CTR) for groups of recommendations associated with the respective annotations for a set of member profiles representing members in the on-line connection system, the personalized popularity score derived using a CTR for groups of recommendations associated with the respective annotations for the subject member profile;
   using at least one processor, determining an order of presentation of carousels based on respective combined popularity scores generated for annotations from the set of context annotations, each carousel having frames representing a subset of the recommended videos identified as associated with a particular annotation from the set of context annotations; and
   generating a presentation user interface (UI) by including the carousels into the UI in the determined order.

2. The method of claim 1, comprising causing displaying of the generated presentation UI on a display device.

3. The method of claim 1, comprising, for the subject member profile, with respect to a plurality of on-line videos provided in the on-line connection system, determining an annotation from the set of context annotations and associating the determined annotation with a respective video, the plurality of on-line videos comprising the recommended videos.

4. The method of claim 3, wherein the determining of an annotation to be associated with a video comprises scoring annotations from the set of context annotation with respect to the video and the subject member profile.

5. The method of claim 1, wherein an annotation from the set of context annotation indicates that an associated video recommendation is similar to one or more videos previously watched by the member.

6. The method of claim 1, wherein an annotation from the set of context annotation indicates that an associated video recommendation is popular among member represented by member profiles that are similar to the subject member profile.

7. The method of claim 1, comprising grouping items from the recommended videos based on their respective associated annotations.

8. The method of claim 1, comprising generating, with respect to the subject member profile, respective relevance scores for a plurality of on-line videos provided by the on-line connection system and selecting, based on their respective relevance scores, the recommended videos for presentation of a display device.

9. The method of claim 1, wherein the calculating of the combined popularity score comprises utilizing respective weights for the global popularity score and the personalized popularity score.

10. The method of claim 1, wherein a carousel from the carousels is a UI component comprising a plurality of frames that can be scrolled through in horizontal order, back and forth.

11. A system comprising:
    one or more processors; and
    a non-transitory computer readable storage medium comprising instructions that when executed by the one or more processors cause the one or more processors to perform operations comprising:
    determining a set of context annotations associated with recommended videos selected for a subject member profile representing a member in an on-line connection system;
    for each annotation from the set of context annotations, calculating a combined popularity score as a combination of a global popularity score and a personalized popularity score, the global popularity score derived using a click through rate (CTR) for groups of recommendations associated with the respective annotations for a set of member profiles representing members in the on-line connection system, the personalized popularity score derived using a CTR for groups of recommendations associated with the respective annotations for the subject member profile;
    determining an order of presentation of carousels based on respective combined popularity scores generated for annotations from the set of context annotations, each carousel having frames representing a subset of the recommended videos identified as associated with a particular annotation from the set of context annotations; and
    generating a presentation user interface (UI) by including the carousels into the UI in the determined order.

12. The system of claim 11, comprising causing displaying of the generated presentation UI on a display device.

13. The system of claim 11, comprising, for the subject member profile, with respect to a plurality of on-line videos provided in the on-line connection system, determining an annotation from the set of context annotations and associating the determined annotation with a respective video, the plurality of on-line videos comprising the recommended videos.

14. The system of claim 13, wherein the determining of an annotation to be associated with a video comprises scoring annotations from the set of context annotation with respect to the video and the subject member profile.

15. The system of claim 11, wherein an annotation from the set of context annotation indicates that an associated video recommendation is similar to one or more videos previously watched by the member.

16. The system of claim 11, wherein an annotation from the set of context annotation indicates that an associated video recommendation is popular among member represented by member profiles that are similar to the subject member profile.

17. The system of claim 11, comprising grouping items from the recommended videos based on their respective associated annotations.

18. The system of claim 11, comprising generating, with respect to the subject member profile, respective relevance scores for a plurality of on-line videos provided by the on-line connection system and selecting, based on their respective relevance scores, the recommended videos for presentation of a display device.

19. The system of claim 11, wherein the calculating of the combined popularity score comprises utilizing respective weights for the global popularity score and the personalized popularity score.

20. A machine-readable non-transitory storage medium having instruction data executable by a machine to cause the machine to perform operations comprising:
    determining a set of context annotations associated with recommended videos selected for a subject member profile representing a member in an on-line connection system;

for each annotation from the set of context annotations, calculating a combined popularity score as a combination of a global popularity score and a personalized popularity score, the global popularity score derived using a click through rate (CTR) for groups of recommendations associated with the respective annotations for a set of member profiles representing members in the on-line connection system, the personalized popularity score derived using a CTR for groups of recommendations associated with the respective annotations for the subject member profile;

determining an order of presentation of carousels based on respective combined popularity scores generated for annotations from the set of context annotations, each carousel having frames representing a subset of the recommended videos identified as associated with a particular annotation from the set of context annotations; and generating a presentation user interface (UI) by including the carousels into the UI in the determined order.

\* \* \* \* \*